(12) United States Patent
Turcanu et al.

(10) Patent No.: US 12,453,664 B2
(45) Date of Patent: Oct. 28, 2025

(54) RETRACTOR RESTRAINT SENSOR ASSEMBLY AND STOP

(71) Applicant: Valeda Company, LLC, Oakland Park, FL (US)

(72) Inventors: Ovidius Turcanu, Delray Beach, FL (US); Edgardo Cardona, Pompano Beach, FL (US)

(73) Assignee: Valeda Company, LLC, Oakland Park, FL (US)

( * ) Notice: Subject to any disclaimer, the term of this patent is extended or adjusted under 35 U.S.C. 154(b) by 468 days.

(21) Appl. No.: 18/150,916

(22) Filed: Jan. 6, 2023

(65) Prior Publication Data

US 2023/0218457 A1 Jul. 13, 2023

Related U.S. Application Data

(60) Provisional application No. 63/297,298, filed on Jan. 7, 2022.

(51) Int. Cl.
*A61G 3/00* (2006.01)
*A61G 3/08* (2006.01)

(52) U.S. Cl.
CPC ........ *A61G 3/0808* (2013.01); *A61G 2203/40* (2013.01)

(58) Field of Classification Search
CPC . A61G 2203/40; A61G 3/0808; B60P 7/0846; B60P 7/0823; B60P 7/083; B60P 7/0838
See application file for complete search history.

(56) References Cited

U.S. PATENT DOCUMENTS

2018/0118088 A1 5/2018 Cardona et al.
2018/0338875 A1* 11/2018 Cardona ................. B66F 7/243

* cited by examiner

*Primary Examiner* — Steven O Douglas
(74) *Attorney, Agent, or Firm* — Daniel Tallitsch; Tyler Schultz

(57) ABSTRACT

A retractor with a sensor assembly, comprising an indicator element and a sensor assembly that generates a signal when the indicator element is within a detection range of the sensor, for detecting the length of withdrawn restraint. The indicator element can be located anywhere along the length of the restraint. In one implementation, the retractor is a motorized retractor and the location of the indicator element is selected whereby the sensor generates the signal when the restraint is nearly or fully withdrawn. In an alternative implementation, the retractor is a motorized retractor configured to winch a wheelchair into a wheelchair securement area of a vehicle and the location of the indicator element is selected whereby the sensor detects the indicator element when a wheelchair is in a desired securement position.

14 Claims, 7 Drawing Sheets

RETRACTOR RESTRAINT SENSOR ASSEMBLY AND STOP

CROSS-REFERENCE TO OTHER APPLICATIONS

This application claims priority to U.S. Provisional Patent Application No. 63/297,298, filed on Jan. 7, 2022, the contents of which are incorporated herein by reference. This application also incorporates by reference the contents of U.S. Patent Application Publication No. 2018/0338875 A1 and U.S. Pat. No. 10,166,907 B2.

TECHNICAL FIELD

The embodiments described and claimed herein relate generally to retractors, including motorized and non-motorized retractors that may be used for either or both winching a wheelchair up a ramp and into a wheelchair accessible van and supporting the wheelchair while being wheeled or pushed into the wheelchair accessible van, and associated equipment and tools. More particularly, the embodiments relate to one or more of a sensor assembly for generating a signal indicative of when a certain or desired length of restraint is withdrawn from the retractor, an indicator element for the sensor assembly that can be positioned anywhere along the length of the restraint, an indicator element insertion kit including tools for attaching the indicator element to the restraint, a stop member for stopping further retraction of the restraint into the retractor and preventing jamming of the retractor, and a breakaway hanger that provides a convenient storage location for the retractor restraints.

BACKGROUND OF THE INVENTION

U.S. Patent Application Publication No. 2018/0338875 A1 discloses a set of two motorized retractors that may be used in a wheelchair accessible vehicle to winch and steer a wheelchair up the ramp of a vehicle and into a wheelchair securement area. After the wheelchair is disposed in a proper position, a pair of rear tie-downs may be secured to a rear of the wheelchair, whereby the pair of motorized retractors and the pair of rear tie-downs may serve as a 4-point wheelchair securement system to restrain movement of the wheelchair during transit. Notably, after the rear tie-downs are applied, the pair of motorized retractors can be triggered in a retraction direction to pre-tension the securement system. U.S. Pat. No. 10,166,907 B2 discloses an improvement to the motorized retractors, namely a rotatable restraint guide at the opening of the retractor housing for guiding the restraint straight onto the spool of the retractor.

SUMMARY OF THE PRESENT EMBODIMENTS

While the prior art retractors satisfactorily perform their required functions, the prior art devices have limitations which the present embodiments overcome, including at least one or more of reduced jamming due to over retraction, precisely locating the wheelchair in a desired location in the wheelchair securement area, and preventing damage to vehicle paneling or other surfaces.

In one embodiment, a retractor is provided with a sensor assembly, comprising an indicator element and a sensor assembly that generates a signal when the indicator element is within a detection range of the sensor, for detecting the length of withdrawn restraint. The indicator element can be located anywhere along the length of the restraint. In one implementation, the retractor is a motorized retractor and the location of the indicator element is selected whereby the sensor generates the signal when the restraint is nearly or fully withdrawn. In this implementation, a motor controller receives the signal and turns the motorized retractor off. A stop member may be positioned on the restraint to hold the indicator element within the detection range of the sensor to prohibit further retraction of the restraint. In an alternative implementation, the retractor is a motorized retractor configured to winch a wheelchair into a wheelchair securement area of a vehicle and the location of the indicator element is selected whereby the sensor detects the indicator element when a wheelchair is in a desired securement position. In this implementation, a motor controller receives the signal and turns the motorized retractor off. However, the motorized retractor is configured whereby the indicator element is allowed to move outside of the detection range of the sensor before stopping, whereby the motor can subsequently be triggered in a retraction direction.

BRIEF DESCRIPTION OF DRAWINGS

These and other features, aspects, objects, and advantages of the embodiments described and claimed herein will become better understood upon consideration of the following detailed description, appended claims, and accompanying drawings.

Figure 1:
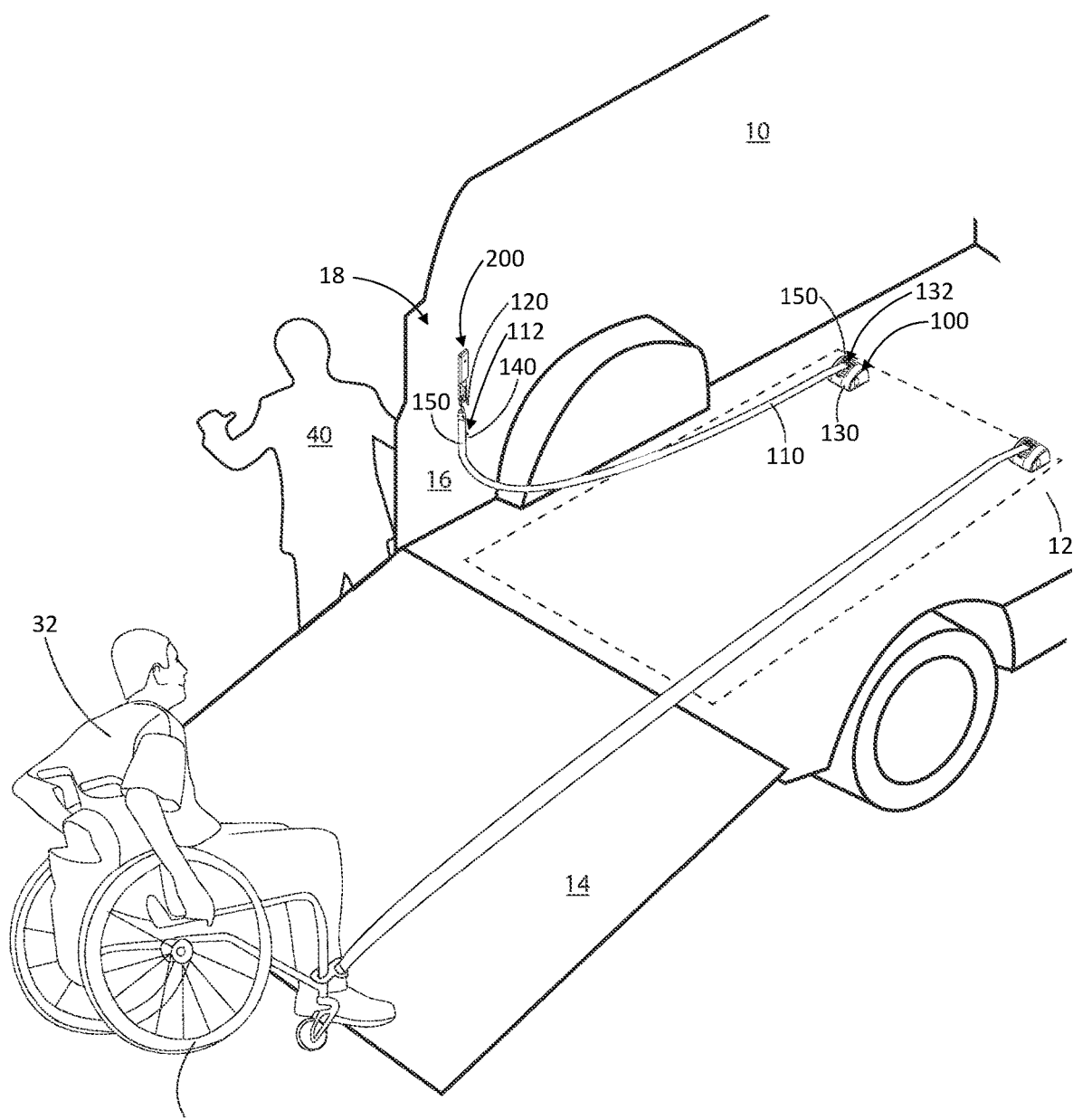
FIG. 1 is a perspective view of a rear-entry wheelchair accessible van that incorporates first embodiments of a retractor restraint sensor assembly, a retractor restraint stop, and a hanger.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE PRESENT EMBODIMENTS

With reference to FIG. 1, a wheelchair accessible van ("WAV") 10 is shown to include a pair of retractors 100 each having a retractable restraint 110 with a hook 120 or other wheelchair connector at a free end. The WAV may be a rear-entry van as shown, a side-entry van, or otherwise. The retractors 100 may be motorized as shown (see, e.g., U.S. Patent Application Publication No. 2018/0338875 A1 and U.S. Pat. No. 10,166,907) and/or spring biased to automatically remove slack from the restraints 110, or otherwise. The restraints 110 may take the form of webbing, cables, chains, straps, or otherwise.

In one implementation, one or more of the retractors 100 may be positioned at a side of a wheelchair securement area 12 opposite a wheelchair ramp 14 and may be motorized to serve as a winch to pull a wheelchair 30 (with or without the wheelchair occupant 32) up the ramp and into the wheelchair securement area 12. See, for example, U.S. Patent Application Publication No. 2018/0338875 A1 and U.S. Pat. No. 10,166,907, which both disclose a motorized retractor. To pull the wheelchair 30 into the vehicle 10, a vehicle operator 40 or the occupant's caretaker may first withdraw the restraints 110 from the retractors 100 and attach the hooks 120 to the wheelchair 30 outside of the vehicle, as shown for the right retractor 100 in FIG. 1. The vehicle operator 40 will then trigger the retractor motors, if available, in a retraction direction to pull the wheelchair 30 up the ramp and into the wheelchair securement area 12. If retractor motors are not provided, the vehicle operator 40 will push the wheelchair 30 up the ramp and into the wheelchair securement area 12. In either case, the retractors 100 may be provided with an automatically locking mechanism, such as a ratchet and pawl or brake, that prevents the retractor 100 from paying out restraint but permits the retraction of restraint into the retractor 100. In that respect, the wheelchair 30 will be prevented from rolling backwards should the retractor motor be turned off by the operator 40 or lose power, or should the operator 40 stop pushing the wheelchair 30 up the ramp, lose grip, and/or trip and fall.

In the case of a rear-entry WAV 10, the retractor(s) 100 may be positioned at a front side of the wheelchair securement area 12 as shown. In the case of a side-entry WAV, the retractor(s) 100 may be positioned at a street side (opposite the curb side) of the wheelchair securement area 12 (where vehicles drive on the right side of the street, this could be the left side of the wheelchair securement area 12; where vehicles drive on the left side of the street, this could be the right side of the wheelchair securement area 12).

For the convenience of the operator 40, one or more hangers 200 may be provided on a vehicle surface 16 at or near the vehicle door opening 18 for holding the hooks 120 or other type wheelchair connector. In one implementation, the hangers 200 will be positioned in a location where the hooks 120 will be within arm's reach of the vehicle operator 40 when standing outside of the vehicle, for convenient access of the hooks 120. The vehicle surface 16 may be any surface of the vehicle such as a wall, floor, ceiling, or pillar, but may typically be a decorative wall panel that lacks significant structural strength. In that respect, if the operator 40 inadvertently operates the retractor motor while the hooks 120 are still connected to the hanger 200, there is a risk that the retractor 100 will damage the wall panel or tear it off of the vehicle. To protect against such damage, the hanger 200 may include a breakaway member, such as a frangible connection. Preferably, the breakaway member is non-destructive and may be resecured when inadvertently broken.

Figure 2:
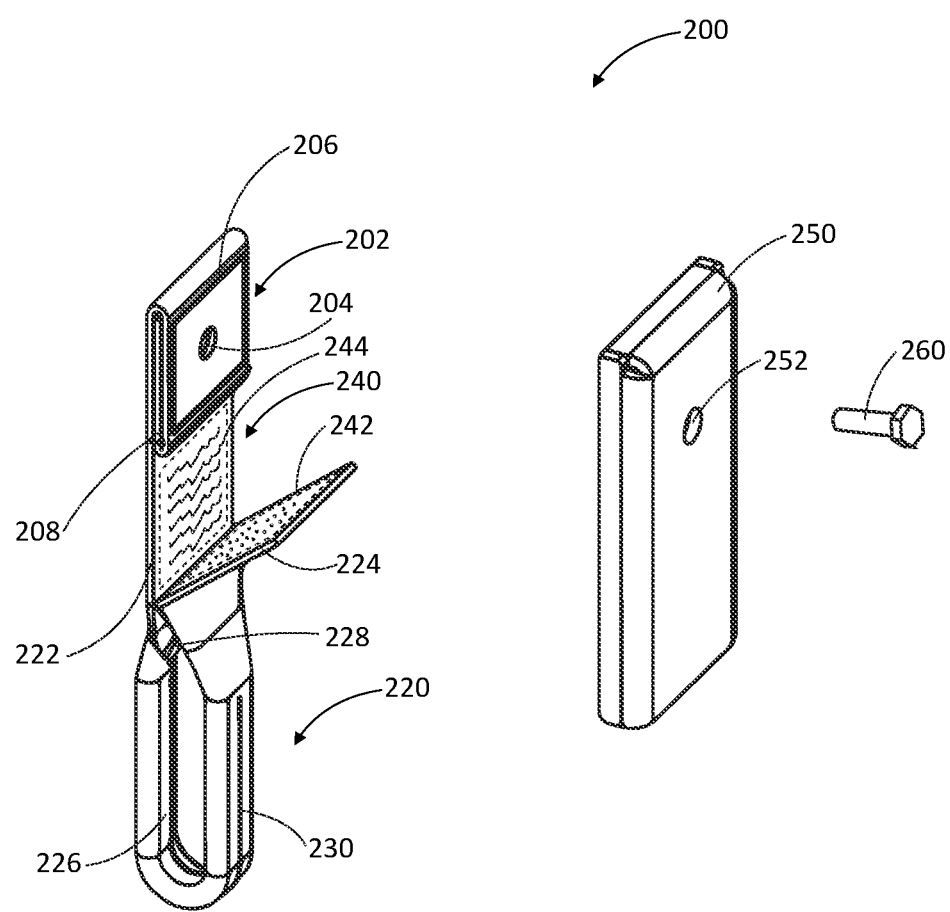
FIG. 2 is an exploded perspective view of the hanger.

One embodiment of a hanger 200 with a breakaway member is shown in exploded form in FIG. 2. The hanger 200 may include a mounting portion 202 configured for securement to the vehicle surface 16, a holding portion 220 for receiving and holding the hook 120, and a frangible connection 240 that detaches when the holding portion 220 is pulled away from the mounting portion 202 with sufficient force. When the frangible connection 240 detaches, the hook 120 may be released from the holding portion 220.

The holding portion 220 may be partially connected to the mounting portion 202 by the frangible connection 240, as shown in FIG. 2. For instance, the holding portion 220 may form a loop as shown, with a first end 222 being rigidly connected to or integral with the mounting portion 202 and a second end 224 being removeably connected (directly or indirectly) to the mounting portion 202 through the frangible connection 240. In alternative embodiments, the frangible connection 240 is the only connection between the holding portion 220 and the mounting portion 202, in which case the holding portion 220 will fully detach from the mounting portion 202 when the frangible connection 240 is broken.

The frangible connection 240 may take several different forms, such as hook and loop connection members (e.g., Velcro), interference-fit connection members (e.g., male and female snap members), friction-fit connection members, or other suitable connections, including connections that detach in a destructive manner. As shown, the frangible connection 240 takes form as a hook connection member 242 and a loop connection member 244. As shown, the hook connection member 242 is fixed to the second end 224 of the holding portion 220 and the loop connection member 244 is fixed to the first end 222 of the holding portion 220. In an alternative implementation, the locations of hook and loop connection members 242, 244 can be reversed. In yet additional implementations, the hook and loop connection members 242, 244 can be located elsewhere, such as between the mounting portion 202 and the vehicle surface 16, between the mounting portion 202 and the holding portion 220, or elsewhere.

As shown, hanger 200 may be provided with a cover panel 250 that is mounted to the vehicle surface 16 concurrently with the mounting portion 202 using a common fastener 250, such as a bolt. In particular, both the mounting portion 202 and cover panel 250 may include corresponding apertures 204, 252 that are configured to overlap and receive the fastener 260. In some alternative implementations, the mounting portion 202 can be secured to the vehicle surface 16 independently from the cover panel 250, and the cover panel 250 can then either be connected to the mounting portion 202 or to the vehicle surface 16 independently from the mounting portion 202.

The cover panel 250 may be designed to obscure one or both of the mounting portion 202 and breakaway member 240 and/or protect those features from the elements (e.g., moisture, dirt, etc.). The structure and geometry of the cover panel 250 may also be selected so as to dictate or contribute to the strength of the breakaway member 240. For example, where the breakaway member 240 is a Velcro-type connection, the shown cover panel 250 (which may be rigid—e.g., a metal panel) prevents or limits the ability for one connection member to be pulled in a direction normal to the other connection member; instead, pulling forces are largely restricted to a direction generally parallel to the plane defined by the connection members (i.e., in shear). If a lower strength connection is desired, the structure or geometry of the cover panel 250 could be modified to permit pulling forces at other angles, including up to a normal angle (which would allow the connection members to be peeled apart). For instance, the cover panel 250 could comprise a flexible material or could be oriented at an angle to the plane of the connection members.

To prevent a motorized retractor 100 from damaging the vehicle surface 16, the structure and geometry of the hanger 200 could be selected so that the breakaway member 240 detaches at a "predetermined" or "threshold" force that is less than a force that would cause material damage to the vehicle surface 16. However, consideration should be given to the risk of injury to vehicle occupants should the breakaway member 240 release during a vehicle accident. In that regard, the structure and geometry of the hanger 200 could also be selected so that the breakaway member 240 will not detach when subjected to a force at least equal to or greater than the mass of the hook 120 accelerated at 20$g$ during an accident.

Figure 4:
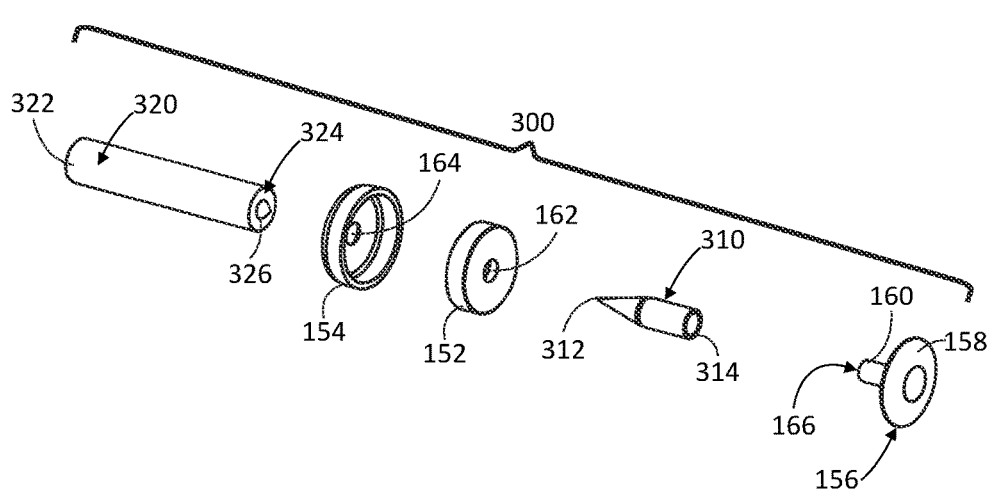
FIG. 4 is an exploded view of a kit for installing the indicator element portion of the retractor restraint sensor assembly.

In one implementation, the hanger 200 can be formed from a webbing material, such as a webbing that is weaved from polyester thread. As shown in FIG. 4, a single strip of webbing can be used to form both the mounting portion 202 and the holding portion 220 in integral-fashion. Specifically, starting from the first end of the strip, a webbing section can be folded over at least once and, as shown, twice. The folded over webbing section can then be sewn together, including using the boxed sewing pattern 206 and the line sewing pattern 208. Staring at the second end of the strip, a second webbing section can be narrowed by folding over two flaps 226, 228 from the side edges of the second webbing section and sewing the flaps together, including using the line sewing pattern 230 along the length of the second webbing section.

Referring now to the retractor 100 shown in FIGS. 1, 3, and 5-6, it may be desirable to prevent the retractable restraint 110 from being retracted fully into the housing 130 of the retractor 100. Where such is not prevented, it may be possible for the hook 120 or the sewing pattern portion 112 of a webbing-type restraint 110 (which typically comprises webbing fabric that is inserted into the eye of the hook 120 and then folded over upon itself and stitched together, thereby having approximately double or more of the thickness of the webbing fabric itself) to become jammed in the retractor (e.g., in the mechanicals inside of the housing 130, such as the ratchet wheels 134, in the housing opening 132 or the restraint guide 160). In that respect, a stop member 140 may be provided on the restraint 110 that engages with the housing 130, the opening 132 in the housing, the restraint guide 160, or other portion of the retractor 100 (including structures inside of the housing 130 of the retractor 100), and prevents further retraction of the restraint 110. In one implementation, the stop member 140 may be configured or positioned to leave at least a small portion of the sewing pattern 112 outside of the opening 132 in the housing or outside of the restraint guide 160, if present. In another implementation, the stop member 140 may be configured or positioned to leave a majority of the sewing pattern 112 outside of the opening 132 in the housing or outside of the restraint guide 160, if present. In yet another implementation, the stop member 140 may be configured or positioned to leave the entire sewing pattern 112 outside of the opening 132 in the housing or outside of the restraint guide 160, if present. In yet another implementation, the stop member 140 may be configured or positioned to leave the hook 120 outside of the opening 132 in the housing or outside of the restraint guide 160, if present.

Figure 3:
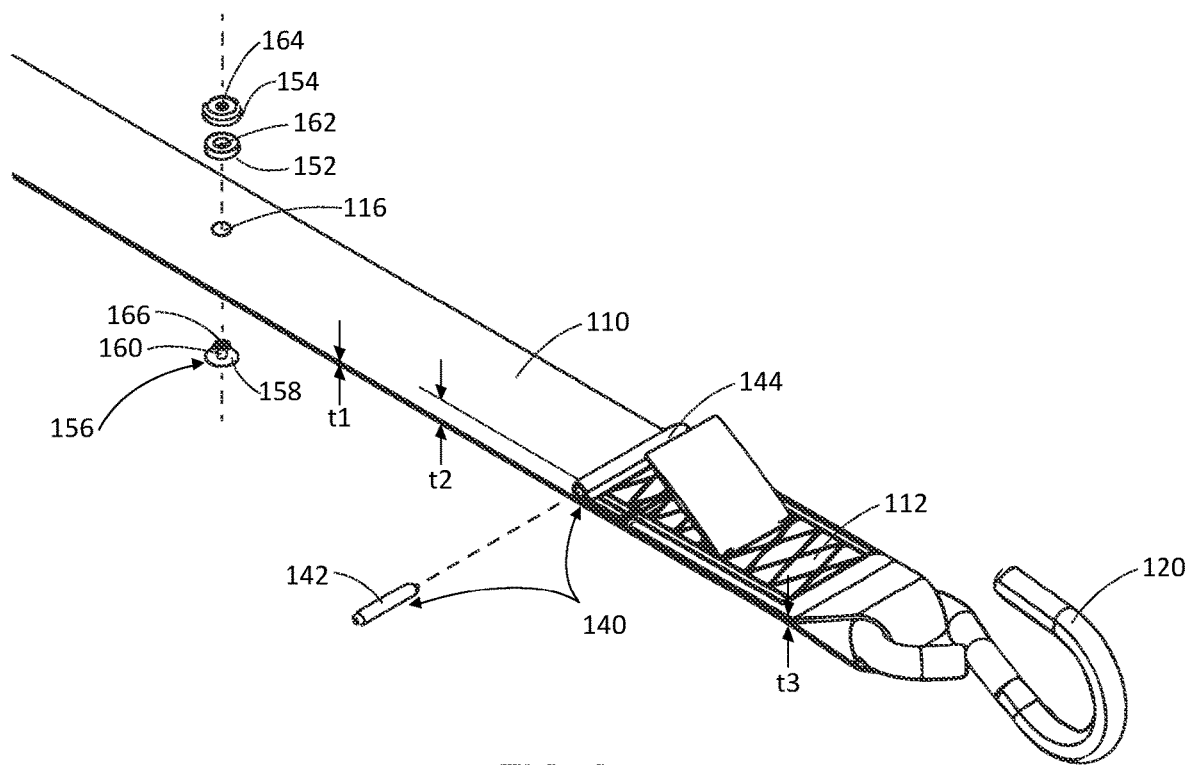
FIG. 3 is an exploded perspective view of the stop and an indicator element portion of the retractor restraint sensor assembly.
Figure 6:
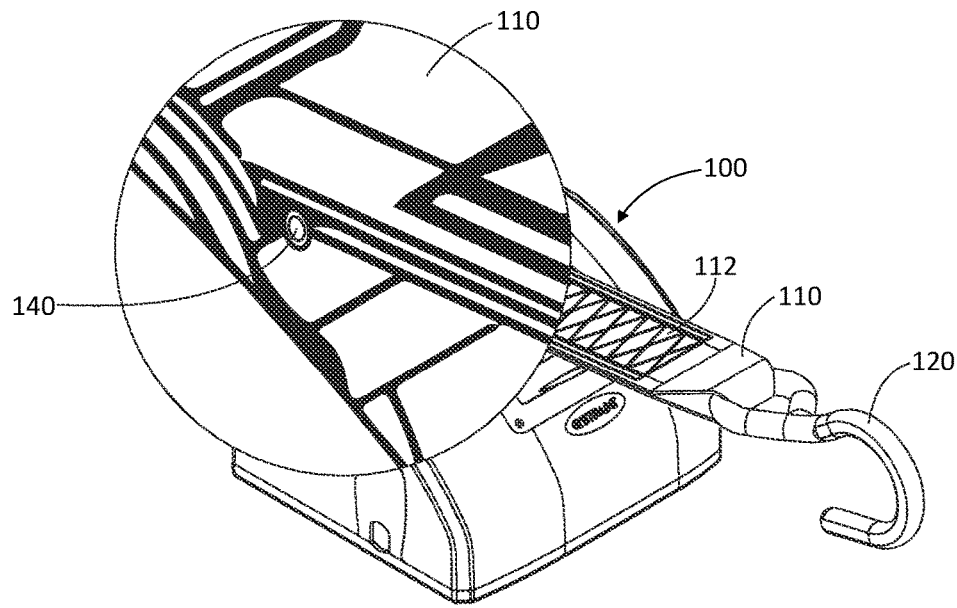
FIG. 6 is a close up perspective view showing the stop engaging with the rotatable guide.
Figure 5:
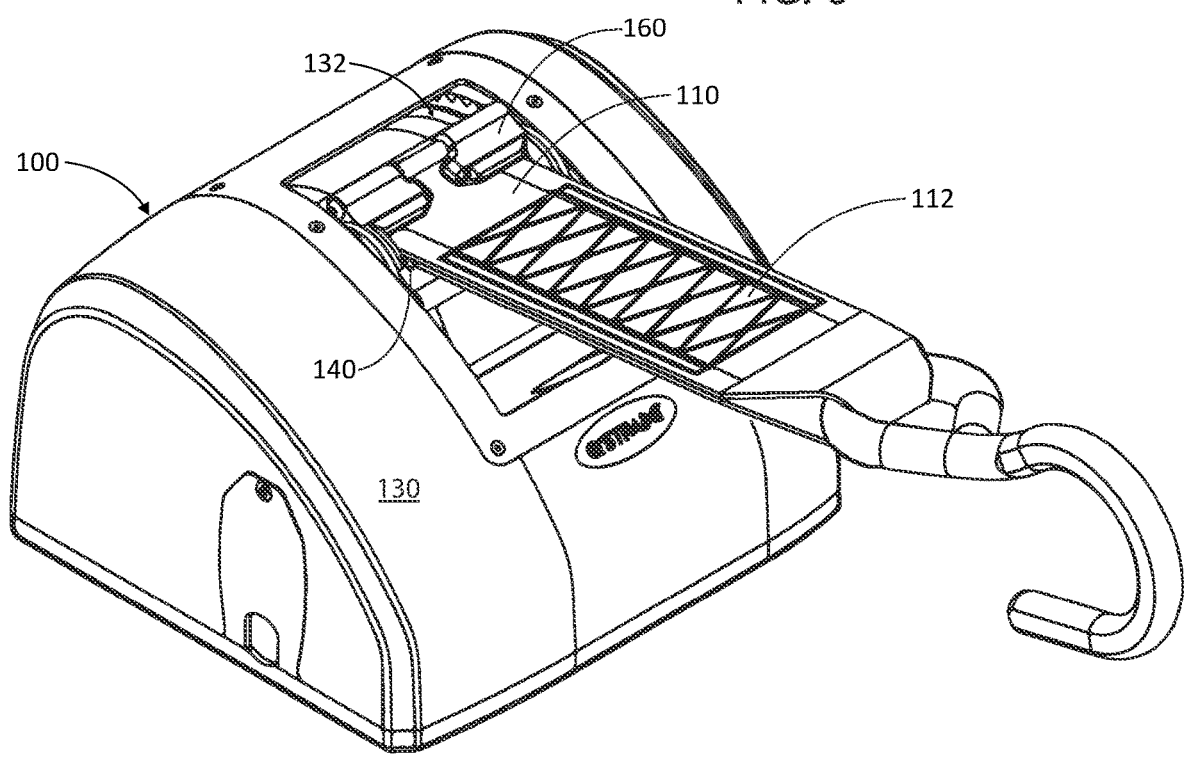
FIG. 5 is a perspective view of a retractor incorporating a rotatable guide that is configured for engagement with the stop.
Figure 7:
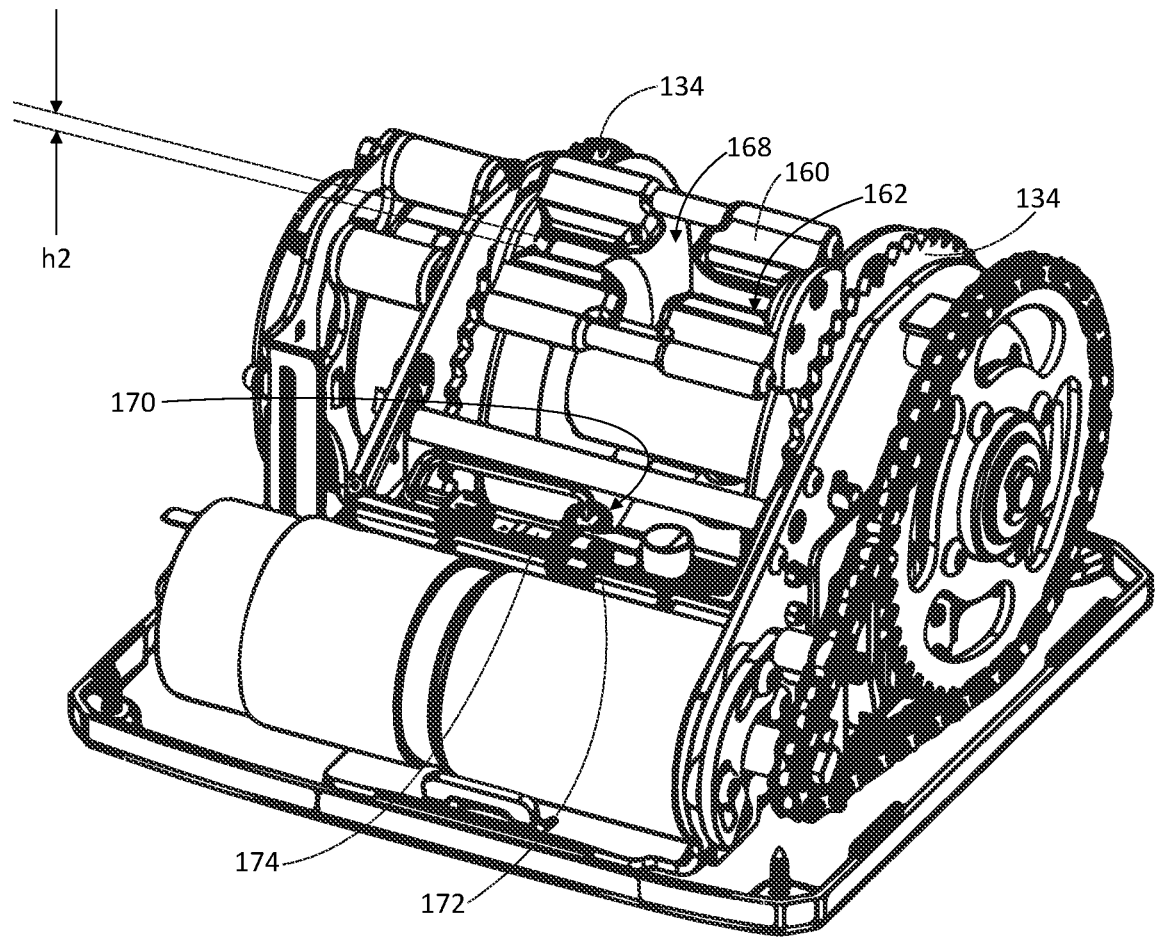
FIG. 7 is a perspective view of the retractor of FIG. 5 with the cover and restraint removed to more clearly depict the rotatable guide and detector assembly portion of the retractor restraint sensor assembly.
Figure 8:
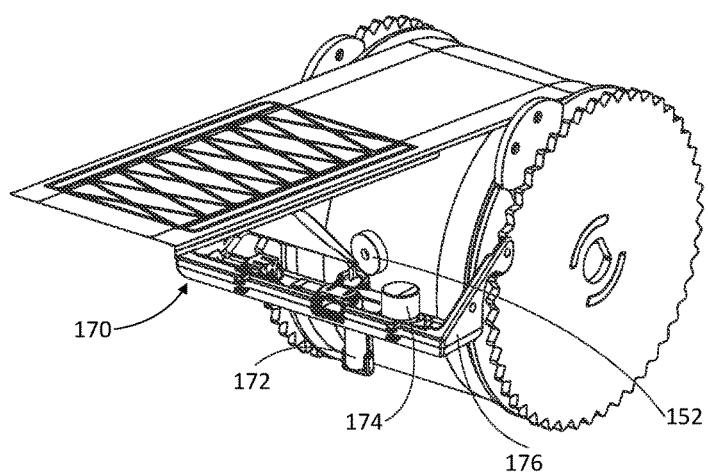
FIG. 8 is a perspective view of the detector assembly portion of the retractor restraint sensor assembly.
Figure 9:
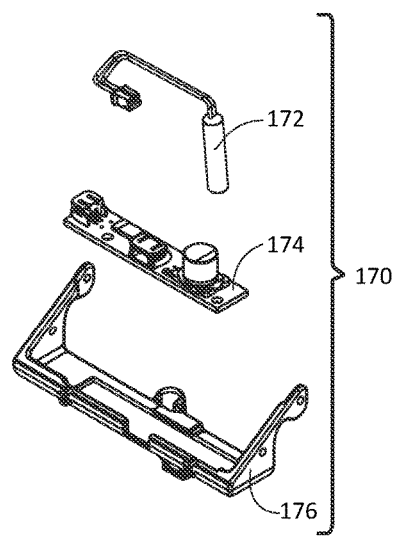
FIG. 9 is an exploded perspective view of the detector assembly portion of the retractor restraint sensor assembly.
Figure 10:
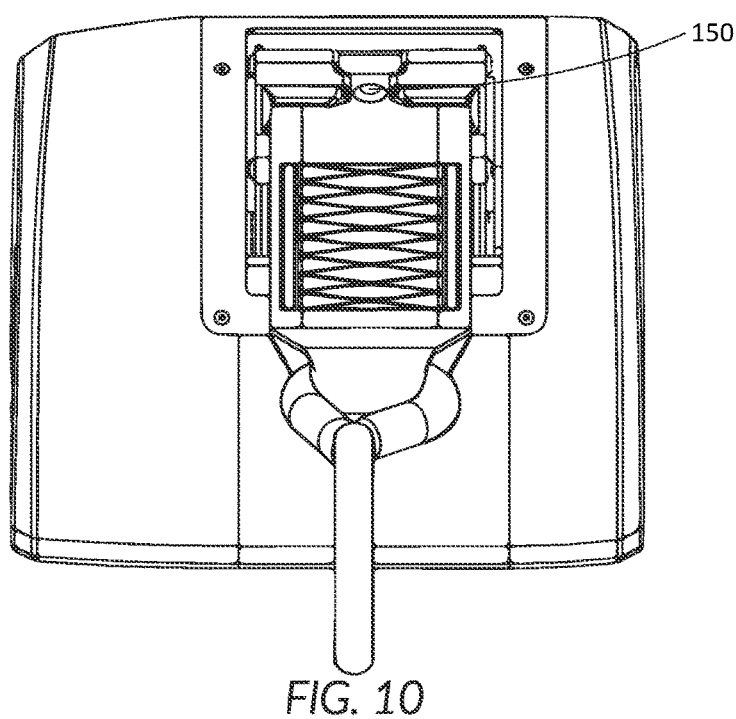
FIG. 10 is a front view of the retractor depicting how the indicator element portion is permitted to pass through the rotatable guide; and, FIG. 11 is a close up front view depicting how the indicator element portion is permitted to pass through the rotatable guide.
Figure 11:
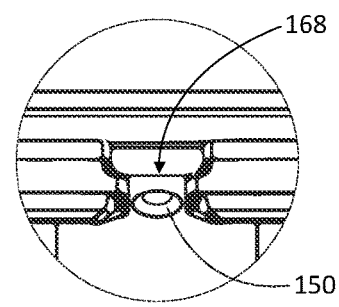

The stop member 140 may take any form. For instance, as shown in FIGS. 3 and 5-6, the stop member 140 may comprise a pin 142 inserted in a pocket 144 formed on the webbing. The pin 142 and pocket 144 collectively increase the thickness of the restraint 110 to a thickness $t2$ (which is greater than the thickness $t1$ of the base material of the restraint 110 itself). Notably, the thickness of the restraint 110 at the stop member 140 ($t2$) may also be greater that the thickness of the restraint 110 at the sewing pattern portion 112 ($t3$), which as described above is where the webbing is folded over upon itself and stitched together. In the depicted embodiment, the stop member 140 is configured to engage with, and not pass through, the webbing guide 160. In particular, as best shown in FIGS. 3 and 7, the height $h1$ of the opening 162 in the webbing guide 160 is less than the thickness $t2$ of the stop member 140, but greater than the thickness $t1$ of the restraint 110. Should the stop member 140 be positioned to permit any portion of the sewing pattern 112 to pass inside the housing 130 of the retractor, the height $h1$ would of course also be greater than the thickness $t3$ of the sewing pattern 112.

To ensure firm engagement between the stop member 140 and the webbing guide 160, the pin 142 may be formed from a rigid material, such as metal or a hard plastic. In addition, as best shown in FIG. 3, the pocket 144 may be formed as an extension of the sewing pattern 112 portion of the restraint 110. More particularly, the restraint 110 may be formed from a single piece of webbing, where the end of the webbing is inserted into the eye of the hook 120 and then folded over upon itself a first time to form the sewing pattern 112 portion of the restraint 110 and then a second time to form the pocket 114, and then stitched together. The pocket 144 preferably is sufficiently small to hold the pin 142 in place via tension/friction, although adhesives or other connectors may be used additionally or alternatively.

Turning now to FIGS. 1, 3, and 7-11, in addition to or as an alternative to the stop member 140, the retractor 100 may be provided with a sensor assembly (comprising one or more sensor sets) that provides one or more signals indicative of the length of restraint 110 that is withdrawn from the retractor. The sensor assembly may be configured to generate one or more signals when the length of the restraint 110 corresponds to one or more of: the position(s) of the stop member 140, the sewing pattern portion 112 and/or the hook 120 relative to a portion of the retractor 100, including the opening 132 and/or restraint guide 160; and the position of the wheelchair 30 on the ramp or in the wheelchair securement area 12. In one implementation, the sensor assembly may comprise one or more indicator elements disposed on the restraint 110, such as the magnet assembly 150 depicted best in FIGS. 1 and 3, and one or more sensors or detector assemblies on or internal to the housing 130 of the retractor 100, such as the detector assembly 170 depicted best in FIGS. 7-9. In the depicted implementation, the detector assembly includes a sensor 172 that is configured to sense when the magnet 152 of the magnet assembly 150 is in close proximity and, in response, to generate a signal reflecting the same.

The magnet assembly 150 comprises at least the magnet 152 that is configured for securement to the restraint 110. As one example, the magnet assembly 150, as best shown in FIG. 3, may additionally comprise a coating or cover 154 configured to protect the magnet 152 from the elements and/or a fastener 156. As shown, the fastener 156 is configured for engagement with one or both of the cover 154 and magnet 152 and, for that purpose, may include a base (or head) 158 and a stem (or tail) 160. The stem 160 may include a tubular portion at least at its end whereby it may serve as a rivet. In a secured configured, the base 158 may engage with one side of the restraint 110 with the stem 160 first passing through a permanent or temporary aperture 116 in the restraint 110, and then passing through one or both of an aperture 162 in the magnet 152 and an aperture 164 in the cover 154. The end of the stem 160 may then be bent outward to create a flange 166 and permanent fix the magnet assembly 150 to the restraint 110. In alternative embodiments, the fastener 156 may take a form other than a rivet; as an example, the stem 160 may include a threaded interior or exterior surface for engagement with corresponding threads on one or both of the magnet 152 or cover 154.

The magnet assembly 150 may be provided as part of a magnet insertion kit 300, along with tools for affixing the magnet assembly 150 to a restraint 110. As one example, a magnet insertion kit 300 may comprise an insertion tool 310 and a riveting tool 320. The insertion tool 310 may includes a pointed tip 312 at one end and a blind hole 314 at the opposite end. The insertion tool 310 is intended to create either the permanent or temporary hole 116 in the restraint 110 for receiving the fastener 156. As an example, for a restraint 110 formed from webbing, the pointed tip 312 allows a temporary hole 116 to be formed by spreading the fibers of the webbing, thereby preventing structural damage to the fibers and maintaining the integrity of the restraint 110. The blind hole 314 in the insertion tool is configured to receive the stem 160 of the fastener 156, whereby the insertion tool can be used as a needle of sorts to push the stem 160 through the temporary hole 116 formed by the pointed tip 312. Notably, because the insertion tool 310 permits the fastener 156 to be inserted without damaging the fibers of the restraint 110, the weave of the webbing can return to its normal state with the application of light tension when/if the fastener is removed. If the fastener 156 is of the rivet type, the magnet insertion kit 300 can additionally include a riveting tool 320 that is configured to compress the stem 160 of the fastener 156. The riveting tool 320 may take the form of an elongated shaft configured to receive the strike of a hammer at one end 322 and a bucking surface 324 at the other end. The bucking surface 324 may include a projection 326, which may be conical in shape, which is received inside of the tubular portion at the end of the stem 160. The projection 326 may serve to center the riveting tool on the fastener 156 prior to being struck with a hammer, and/or may also provide the desired contour (e.g., conical) for the stem 160 after compression.

The magnet assembly 150 may be configured to secure the magnet 152 at either a predetermined position or a custom position on the restraint 110. For instance, the magnet assembly 150 may be located in a predetermined position where the magnet 152 will be detected by the sensor 172 just prior to when the stop member 140 (if present) engages with the retractor 110. In other implementations, the magnet assembly 150 may be located in a predetermined position where the magnet 152 will be detected by the sensor 172 in at least any of the following circumstances: when at least a small portion of the sewing pattern 112 remains outside of the opening 132 in the housing or outside of the restraint guide 160, if present; when at least a majority of the sewing pattern 112 remains outside of the opening 132 in the housing or outside of the restraint guide 160, if present; when only or substantially only the entire sewing pattern 112 remains outside of the opening 132 in the housing or outside of the restraint guide 160, if present; when only or substantially only the hook 120 remains outside of the opening 132 in the housing or outside of the restraint guide 160, if present. In yet another implementation, the magnet assembly 150 may be located in a custom position on the restraint 110 by the end user, for example, to generate a signal when the wheelchair 30 is positioned in a desired location, such as in the desired securement location within the wheelchair securement area 12, or just prior to when the wheelchair 30 or the wheelchair occupant 32 is expected to hit an obstruction in the vehicle 10. In any of the previous examples, the signal generated when the sensor 172 detects the magnet 152 may be used to trigger an alert or alarm, which may be visual, auditory, or tactile, for the wheelchair occupant 32 or vehicle operator 40. The signal may additionally or alternatively be used by the retractor 100 to stop and/or prevent further retraction of the restraint 110. For example, the signal may be used to turn the motor of a motorized retractor 100 off.

The detector assembly 170 comprises at least the sensor 172, which may take the form of any sensor capable of detecting the magnitude of or changes in magnetism and geomagnetism generated by a magnet or current, including but not limited to a coil, reed switch, hall elements, and other known detectors. As discussed above, the sensor 172 may be disposed in any convenient location on or in the housing 130 of the retractor 100, or may be disposed in a remote location elsewhere. As depicted in FIG. 7, the sensor 172 may be disposed internal to the housing 130 where it is positioned to detect the indicator element 150 after it enters the housing 130 of the retractor and is coiled on the spool of the retractor, and as it passes by the sensor 172. As best shown in dashed lines in FIG. 10, the sensor 172 will detect the magnet 152 (or other indicator element) after it has passed through the restraint guide 170 and rotated with the spool of the retractor approximately % rotation. In that regard, the restraint guide 160 may include an enlarged window or slot 168 that permits the indicator element 150 to pass therethrough.

Notably, the indicator element 150 may be moving rather quickly pass the sensor 172. In some instances, the sensor will pick up and then lose the indicator element 150 faster than a programmable motor controller can receive the sensor signal and turn the motor off. In that regard, the detector assembly 170 may additionally comprise a printed circuit board (PCB) 174 including a delay circuit (e.g., a capacitor) that stores the signal from the sensor 172 for a predetermined period of time (for example, approximately 100-200 ms) to allow the programmable motor controller, which will receive the signal from the PCB 174, to catch up.

In certain instances, for example when the sensor assembly is being used to turn the motor of the retractor 100 off when the restraint 110 is fully or near fully retracted, it may be desirable to also use the stop member 140. Indeed, as recognized above, the indicator element 150 may be moving rather fast as it approaches the detector assembly 170. While means for ensuring the motor controller is able to timely shut the motor off, it may be possible for the indicator element to fully pass the detector assembly 170 where it will be out of range of the sensor 172. In that regard, the motor controller will not be able to receive a signal that would otherwise prevent the operator 40 from triggering the motor in the retraction direction, thereby creating the risk of jamming the retractor 100. However, the use of both the indicator element 150 and the stop member 140, with appropriate spacing between the two, will allow the indicator element 150 to trigger the motor off, and the stop member 140 to prevent momentum or inertia from continuing to move the indicator element 150 out of range of the detector assembly 170.

In other implementations, for example where the sensor assembly is being used to properly position the wheelchair 30 in the wheelchair securement area 12, the fact that momentum or inertia will push/pull the indicator element 150 pass the zone of detection of the detection assembly 170 can have a beneficial purpose. Indeed, where the retractors 100 are used not only as a winch, but also as wheelchair tie-downs, additional tie-downs can be secured to the rear of the wheelchair 30 (of course, after the wheelchair 30 is properly positioned in the wheelchair securement area 12). Because the detection assembly 170 will not detect the indicator element 150, the motor controller will permit the operator 40 to trigger the motors of the retractors 100 a second time, also in a retraction direction, to pretension of both the restraints 110 of the retractors 100, but also the rear tie-downs.

In any embodiment, it may be desirable for the programmable motor controller to be programmed where the operator 40 is only precluded from triggering the motor of the retractors 100 in a retraction direction when the detection assembly 170 detects the indicator element 150. In that respect, the operator 40 will be able to trigger the motor in a pay out direction to permit offloading of the wheelchair 30 from the vehicle 10 and down the ramp.

As an alternative to the magnet type sensor assembly, other types of indicator elements and detectors can be used. For example, the indicator element can be a visual feature on the restraint, such as a particular structure or shape, printed shape or object, tag, or color, and the detector may be an optical sensor that detects the visual feature. In addition, multiple indicator elements can be utilized, such as any combination multiple magnets having different strengths and multiple different visual features, wherein each of the multiple indicator elements serve a different purpose, function, or mode. For example, one indicator element can serve to generate a signal indicative of when the wheelchair 30 is in a desired location and a second indicator element can serve to generate another signal indicative of when the restraint 110 is fully or near-fully retracted.

In addition to the appended claims, various preferred aspects of the various inventions are outlined below in the following numbered paragraphs:

1. A hanger configured to provide a storage location for a wheelchair connector of an electrical retractor in a wheelchair securement system, the hanger comprising:
    a mounting portion configured for securement to a surface;
    a holding portion configured to receive and hold the wheelchair connector;
    wherein the mounting portion is connected to the holding portion at least partially by a frangible connection and the frangible connection detaches when the holding portion is pulled away from the mounting portion at a threshold force.
2. The hanger of aspect 1, wherein the frangible connection non-destructively detaches when the holding portion is pulled away from the mounting portion at the threshold force.
3. The hanger of any of the previous aspects, wherein the frangible connection is selected from the group including: hook and loop connectors, interference-fit connection members, male and female snap members, and friction-fit connection members.
4. The hanger of any of the previous aspects further comprising a cover, wherein: the frangible connection includes a hook portion and a loop portion; one of either the hook portion or the loop portion is connected to the holding portion; the other of the hook portion or the loop portion is connected to the mounting portion; and the hook portion and loop portion is configured to be disposed between the surface and the cover.
5. The hanger of aspect 4, wherein the cover restricts relative movement of the hook portion and the loop portion along a plane defined by the hook and loop portion.
6. The hanger of aspects 4-5, wherein the threshold force is at least partially defined by compression of the hook and loop portions between the surface and the cover.
7. The hanger of any of the previous aspects, wherein the threshold force is at least partially defined by the strength of the frangible connection.
8. The hanger of any of the previous aspects, wherein the threshold force is at least partially defined by the dimensions of the frangible connection.
9. The hanger of any of the previous aspects, wherein the threshold force is approximately equal to or less than a maximum pulling force of a retractor.
10. The hanger of any of the previous aspects, wherein the threshold force is approximately equal to or less than a force that would cause damage to the surface.
11. The hanger of any of the previous aspects, wherein the threshold force is approximately equal to or greater than a dynamic force exerted on the wheelchair connector during a 20g accident.
12. The hanger of any of the previous aspects, wherein the holding portion forms a loop with a fixed connection to the mounting portion at a first end and the frangible connection at a second end.
13. The hanger of aspect 12, wherein; a first portion of the frangible connection is fixed to the second end of the loop; and, a corresponding, second portion of the frangible connection is fixed at a location selected from the group including the first end of the loop, the mounting portion, and an interface between the mounting portion and the first end of the loop.
14. The hanger of any of the previous aspects, wherein the holding portion and the mounting portion are formed from a single continuous section of webbing.
15. A retractor comprising:
    a restraint being retractable into the retractor and extending through an opening in a housing of a retractor, wherein a first end of the restraint is secured inside a housing of the retractor, a second end is disposed outside of the housing, and the second end of the restraint is secured to a wheelchair connector and includes an end portion where the restraint is secured to the wheelchair connector;
    a stop member positioned on the restraint proximate the end portion, wherein the stop member is configured to engage with the retractor to prevent at least a fraction of the end portion from entering the housing of the retractor through the opening.
16. The retractor of aspect 15, wherein at least a majority of the end portion is precluded from entering the housing.

17. The retractor of aspect 15, wherein the stop member prevents the entire end portion from entering the housing.
18. The retractor of any of aspects 15-17, wherein the restraint includes a pocket immediately adjacent the end portion and opposite the wheelchair connector, the pocket defining the stop member.
19. The retractor of aspect 18, wherein the pocket holds a rigid pin.
20. The retractor of any of aspects 15-19, wherein the restraint is a webbing and the end portion comprises at least two stacked sections of webbing that are sewn together.
21. The retractor of aspect 20, wherein the webbing at the second end first extends through an eye of the wheelchair connector and is folded upon itself to define the end portion, and is then folded upon itself again to at least partially define the stop member.
22. The retractor of any of aspects 15-21, wherein the opening in the retractor is defined by a webbing guide having a height at least equal to a thickness of the restraint and less than a thickness of the stop member.
23. An indicator element insertion kit comprising:
    an indicator element comprising a first coupling portion with a stem and a second coupling portion configured to engage with the stem;
    an insertion tool for inserting the stem through a restraint, the insertion tool comprising a pointed tip at a first end and a holding member at a second end, the holding member configured to receive the stem.
24. The indicator element insertion kit of aspect 23, wherein the second coupling portion comprises a magnet.
25. The indicator element insertion kit of aspect 24, wherein the magnet is encapsulated to protect the magnet from the elements.
26. The indicator element insertion kit of aspect 24, wherein the second coupling portion further comprises a cover for protecting the magnet from the elements.
27. The indicator element insertion kit of aspect 24, wherein the first coupling portion comprises a magnet.
28. The indicator element insertion kit of aspect 24, wherein the first coupling portion and the second coupling portion engage via a set of threads.
29. The indicator element insertion kit of aspect 24, wherein at least an end of the stem includes a tubular rivet portion that can be compressed for engagement with the second coupling portion.
30. The indicator element insertion kit of aspect 29, wherein the second coupling portion includes an aperture for receiving the end of the stem.
31. The indicator element insertion kit of any of aspects 29-30 further comprising a compression tool, the compression tool comprising an elongated bar with a bucking surface at a first end and configured to receive a hammer strike at a second end.
32. The indicator element insertion kit of aspect 31 wherein the bucking surface comprises a conical projection.
33. The indicator element insertion kit of aspect 32, wherein the aperture of the second coupling portion includes a conical receiving portion for receiving the end of the stem after compression.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

The invention claimed is:
1. A retractor defined by a restraint having a first end connected to a spool and a second end, the second end being a free end, the restraint being retractable upon the spool to a coiled position and withdrawable from the spool to an extended position, the retractor comprising a sensor assembly for generating a signal indicative of a length of the restraint that is withdrawn from the retractor, the sensor assembly comprising a sensor and an indicator element, wherein the indicator element is disposed at a location on the restraint and the sensor detects when the indicator element is proximate the sensor.
2. The retractor of claim 1, wherein the sensor is disposed proximate the spool whereby the sensor is configured to detect the indicator element when the indicator element is located in the coiled position and within a range of the sensor.
3. The retractor of claim 2, wherein the sensor is disposed at a radial of the spool.
4. The retractor of claim 2, wherein a restraint take off point is defined as a transition from the coiled position to the extended position; the restraint take off point is located at a first radial of the spool; the sensor is located at a second radial of the spool; and the first radial is offset from the second radial by at least 90 degrees.
5. The retractor of claim 4, wherein the first radial is offset from the second radial by at least 180 degrees.
6. The retractor of claim 1 further comprising a motor and a motor controller, wherein the motor is coupled to and rotates the spool in at least a restraint retracting direction and the motor controller is programmed to turn the motor off upon receipt of the signal.
7. The retractor of claim 6 further comprising a delay circuit configured to hold the signal from the sensor for a predetermined period of time and to transfer the signal to the motor controller.
8. The retractor of claim 6, wherein the indicator element is disposed outside of a detection range of the sensor after the motor is turned off by the motor controller.
9. The retractor of claim 6, wherein the motor controller is programmed to prohibit triggering of the motor in the restraint retraction direction while receiving the signal.
10. The retractor of claim 9, wherein the motor controller is programmed to permit triggering of the motor in a restraint withdrawal direction while receiving the signal.
11. The retractor of claim 1, wherein the sensor assembly generates a signal when one of a stop member, a sewing pattern, and a wheelchair connector is positioned generally adjacent an opening in a housing of the retractor.
12. The retractor of claim 1, wherein the sensor detects the indicator element when a stop member is positioned generally adjacent an opening in a housing of the retractor, and the stop member engages with the opening to hold the indicator element within a detection range of the sensor.
13. The retractor of claim 1, wherein the indicator element is a magnet and the sensor is a magnet sensor.
14. The retractor of claim 1 further comprising a housing with a webbing guide through which the restraint passes, the webbing guide including an enlarged slot for receiving the indicator element.

* * * * *